US008043500B2

(12) United States Patent
Murg

(10) Patent No.: US 8,043,500 B2
(45) Date of Patent: Oct. 25, 2011

(54) AIRCRAFT POTABLE WATER DISINFECTION/SANITATION SYSTEM

(75) Inventor: Larry J. Murg, Aurora, OH (US)

(73) Assignee: TransDigm, Inc., Cleveland, OH (US)

( * ) Notice: Subject to any disclaimer, the term of this patent is extended or adjusted under 35 U.S.C. 154(b) by 262 days.

(21) Appl. No.: 11/790,751

(22) Filed: Apr. 27, 2007

(65) Prior Publication Data
US 2008/0267820 A1 Oct. 30, 2008

(51) Int. Cl.
*C02F 1/78* (2006.01)
(52) U.S. Cl. .................. 210/192; 210/205; 210/241
(58) Field of Classification Search .......... 210/760, 210/764, 153, 167.3, 192, 205, 209, 241
See application file for complete search history.

(56) References Cited

U.S. PATENT DOCUMENTS

| | | | | |
|---|---|---|---|---|
| 4,619,763 A | * | 10/1986 | O'Brien | 210/192 |
| 4,767,525 A | * | 8/1988 | Campbell et al. | 210/760 |
| 4,871,452 A | * | 10/1989 | Kohler et al. | 210/202 |
| 5,547,584 A | | 8/1996 | Capehart | |
| 2003/0015481 A1 | * | 1/2003 | Eidem | 210/192 |
| 2003/0024863 A1 | * | 2/2003 | Gannon et al. | 210/192 |
| 2004/0217068 A1 | * | 11/2004 | Kirby | 210/760 |
| 2005/0103725 A1 | * | 5/2005 | Palm et al. | 210/760 |
| 2005/0155938 A1 | | 7/2005 | Wilp | |

FOREIGN PATENT DOCUMENTS

EP 835222 B1 * 9/1999

* cited by examiner

*Primary Examiner* — Nam Nguyen
*Assistant Examiner* — Lucas Stelling
(74) *Attorney, Agent, or Firm* — Baker & Hostetler LLP

(57) ABSTRACT

A system and method of disinfecting and sanitizing potable water on an aircraft. An ozone generator generates a supply of ozone which is fed into an injector. A pump is connected to a water supply line and an end of an injector. Water flows from the water supply line through the pump and into the injector where the water and the supply of ozone mix to disinfect the water.

7 Claims, 4 Drawing Sheets

AIRCRAFT POTABLE WATER DISINFECTION/SANITATION SYSTEM

FIELD OF THE INVENTION

The present invention relates generally to water disinfection and sanitation. More particularly, the present invention relates to an aircraft potable water disinfection/sanitation system using ozone.

BACKGROUND OF THE INVENTION

The Environmental Protection Agency requires that an aircraft water system be sanitized and inspected on a scheduled basis. Therefore, in order to meet these requirements, systems for disinfecting and sanitizing the water on an aircraft have been developed. Many of these systems include the use of caustic chemicals and are only as effective as the technician performing the tasks required.

One system uses a clean and purge process using chlorine or chlorine dioxide. While cleaning the water system with chlorine disinfects the potable water, it also has several disadvantages. The chlorine may cause corrosion to the water system's equipment and produces the carcinogen trihalomethane (THM) which may remain in the potable water supply after cleaning. Furthermore, chlorine does not break down bio-film on the water system's equipment below a concentration of 50 parts per million, and it only minimally inhibits bio-film from reforming on the water system's equipment.

The use of chlorine dioxide eliminates some of the problems associated with cleaning and purging with chlorine. Chlorine dioxide does not produce the carcinogenic THMs associated with the use of chlorine. Chlorine dioxide also breaks down bio-film and can inhibit reformation of bio-film on the water system's equipment. However, the use of chlorine dioxide to clean the water system can still lead to corrosion of the water system's equipment. Additionally, the use of both chlorine and chlorine dioxide is time consuming and is only as effective as the technician carrying out the process.

Another option is to clean the water system using copper-silver ionization. This process leaves minimal deposits of copper on the water system's equipment and causes no corrosion of the equipment. However, copper is toxic to aquatic species and depending on the concentration of the chemical, it will not break down bio-film or inhibit its reformation.

Ultra-violet (UV) radiation or a combination of UV radiation and chlorine can also be used to clean the water system. The use of UV radiation eliminates the use of a chemical, has no impact on the water system's equipment, and no adverse environmental or health effects. UV radiation, however, does not break down bio-film or prevent it from reforming on the water systems equipment. UV radiation, with the addition of chlorine, breaks down bio-film at concentrations above 50 parts per million, but has little effect on the reformation of the bio-film after cleaning. The addition of the chlorine also introduces the problems of possible corrosion of the water system's equipment and the inclusion of the carcinogen THM in the potable water. These and other disadvantages exist with known systems.

SUMMARY OF THE INVENTION

The foregoing disadvantages are overcome, to a great extent, by the present invention, wherein in one aspect an apparatus and method is provided that in some embodiments provides an improved aircraft potable water disinfection and sanitation system.

In accordance with one aspect of the present invention, a water treatment module for use in an aircraft potable water system includes at least one ozone generator having an outlet defining a path for a supply of ozone to exit the ozone generator. The water treatment module may also include a pump having an inlet and an outlet and defining a first flow path for water through the pump and an injector, such as, for example, an injection venturi. The injection venturi has one end coupled to the pump and a second end defining a second flow path through the injector and an inlet defining a third flow path for the supply of ozone to enter the injector, mix with the water and exit the injector.

In accordance with another aspect of the present invention, the ozone generator uses electrical current to convert oxygen ($O_2$) to ozone ($O_3$). The water treatment module can include multiple ozone generators. Energy consumption can also be, for example, less than 425 watts. The water treatment module can include a disinfection cycle to disinfect the untreated water and a sanitation cycle to remove and inhibit bio-film.

In accordance with another aspect of the present invention, an aircraft potable water system includes a water treatment module including at least one ozone generator having an outlet defining a path for a supply of ozone to exit the ozone generator and a pump coupled to a water supply line and defining a flow path for untreated water from the water supply line to flow into the pump. The water treatment module may also include an injector, such as, for example, an injection venturi, having one end coupled to the pump and a second end coupled to the water supply line and having an inlet defining a second flow path for the supply of ozone to enter the valve, mix with the untreated water and reenter the water supply line, a water tank, and water transport lines connecting the water tank to regions of an aircraft needing a supply of potable water.

In accordance with yet another aspect of the present invention a method of disinfecting and sanitizing potable water in an aircraft includes introducing water from a water supply line to a pump and generating a supply of ozone in at least one ozone generator. The method can also include mixing the water and the supply of ozone in an injector having one end coupled to the pump and a second end coupled to the water supply line and having an inlet coupled to the ozone generator through which the supply of ozone may flow and shunting ozonated water into the water supply line.

In accordance with still another aspect of the present invention, the method further includes converting oxygen ($O_2$) to ozone using electrical current. The method preferably uses low power components such that less than, for example, 425 watts of power is consumed. Although, any suitable power components may be used. The method further comprises disinfecting the water using the supply of ozone and also sanitizing water transport lines, a water tank, and the water supply lines using the supply of ozone.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
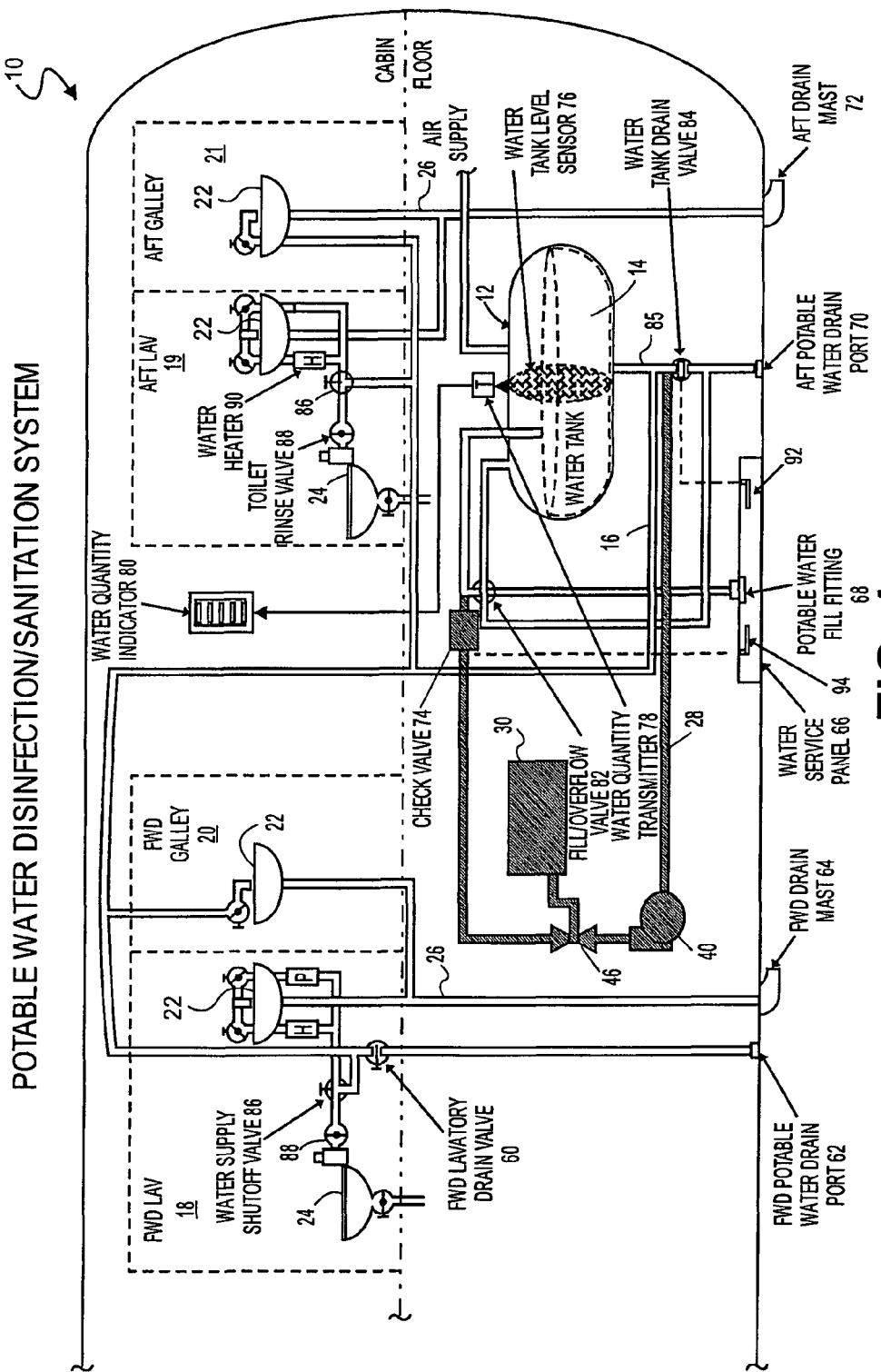
FIG. 1 is a schematic view of an aircraft potable water disinfection and sanitation system according to one embodiment of the invention.

The invention will now be described with reference to the drawing figures, in which like parts are referred to with like reference numerals throughout. One embodiment of the present invention provides an apparatus and method for disinfecting and sanitizing potable water on an aircraft. The present invention may include at least one ozone generator to generate a supply of ozone, a pump, and an injector to mix water and the supply of ozone.

FIG. 1 is a schematic view of an aircraft potable water disinfection and sanitation system 10 according to one embodiment of the invention. FIG. 1 illustrates a water tank 12 holding a supply of potable water 14 for use in, for example, an aircraft. Water transport lines 16 connect the water tank 12 to areas of the aircraft needing a supply of potable water, such as, for example, the lavatories 18 and galleys 20. Potable water 14 flows through the water transport lines 16 to supply sinks 22 and toilets 24 in the forward and aft lavatories 18, 19 and galleys 20, 21, respectively. Waste water drain lines 26 transport waste water away from the lavatories 18 and galleys 20. Additionally, a water supply line 28 carries the potable water 14 from the water tank 12 to a water treatment module 30.

The water treatment module 30 may be used to disinfect the potable water 14 stored in the water tank 12. The water treatment module 30 includes a pump 40 which may take the form of a centrifugal (or other) pump and an injector 46 which may take the form of an injection venturi. The disinfected potable water 14 can then be transported to the lavatories 18 and galleys 20 within the aircraft via the water transport lines 16. The water treatment module 30 may also be used to sanitize the water tank 12, water transport lines 16, and water supply lines 28, remove bio-film from the water tank 12 and water transport lines 16, and prevent the reformation of bio-film after sanitization. This assists in maintaining the disinfected water suitable for human consumption while it is stored in the water tank 12 and travels throughout the aircraft in the water transport lines 16.

Also, as illustrated in FIG. 1, the aircraft potable water disinfection and sanitation system 10 includes a lavatory drain valve 60 positioned on a water transport line 16 located in the forward lavatory 18. This lavatory drain valve 60 can be used to control the flow of potable water out of the forward potable water drain port 62. A forward drain mast 64 provides a path for waste water generated in the forward lavatory 18 and the forward galley 20 to exit the aircraft with reduced contamination of a fuselage of the aircraft.

The water tank drain valve 84 controls the flow of potable water through a pipe 85 connected to the water tank 12. If the water tank drain valve 84 is open, potable water 14 flows out of the water tank 12, through the pipe 85, and out of the aircraft through the aft potable water drain port 70. The aft drain mast 72 provides a path for waste water generated in the aft lavatory 19 and aft galley 21 to exit the aircraft with minimal contamination to the fuselage.

A water supply shut off valve 86 is located in both the forward lavatory 18 and the aft lavatory 19. The supply of potable water from the water tank 12 to the sinks 22 and toilets 24 can be shut off using the water supply shut off valve 86. A toilet rinse valve 88 located in both the forward lavatory 18 and the aft lavatory 19 can be used to control the supply of potable water to the toilets 24. A water heater 90 may also be located in one or both of the forward lavatory 18 and the aft lavatory 19. The water heater 90 is connected to the water transport line 16 that is in turn connected to the sinks 22 and can be used to provide heat to the potable water 14 supplied to these sinks 22.

A water service panel 66 provides for control of the aircraft potable water disinfection and sanitation system 10 from outside of the aircraft and includes a control 92 for the water tank drain valve 84 and a control 94 for a check valve 74. The water service panel 66 also includes a potable water fill fitting 68 so that the water tank 12 can be refilled with water.

A water tank level sensor 76 may be disposed within the water tank 12 to sense the level of water 14 within the water tank 12. The water tank level sensor 76 transmits the level of the water 14 to a water quantity transmitter 78, which transmits the information on the quantity of the water 14 to a water quantity indicator 80 within a cabin of the aircraft.

A fill and overflow valve 82 is located on a pipe extending from the potable water fill fitting 68 to the water tank 12. If the valve 82 is opened, water being input into the system through the fill and overflow valve 82 can flow into the water tank 12. The fill and overflow valve 82 also can be opened, such that, if the water tank 12 is overfilled, any excess water can flow out of the water tank 12, through the fill and overflow valve 82 and out of the potable water disinfection and sanitation system 10 through the pipe 85 connected to an aft potable water drain port 70.

Figure 2:
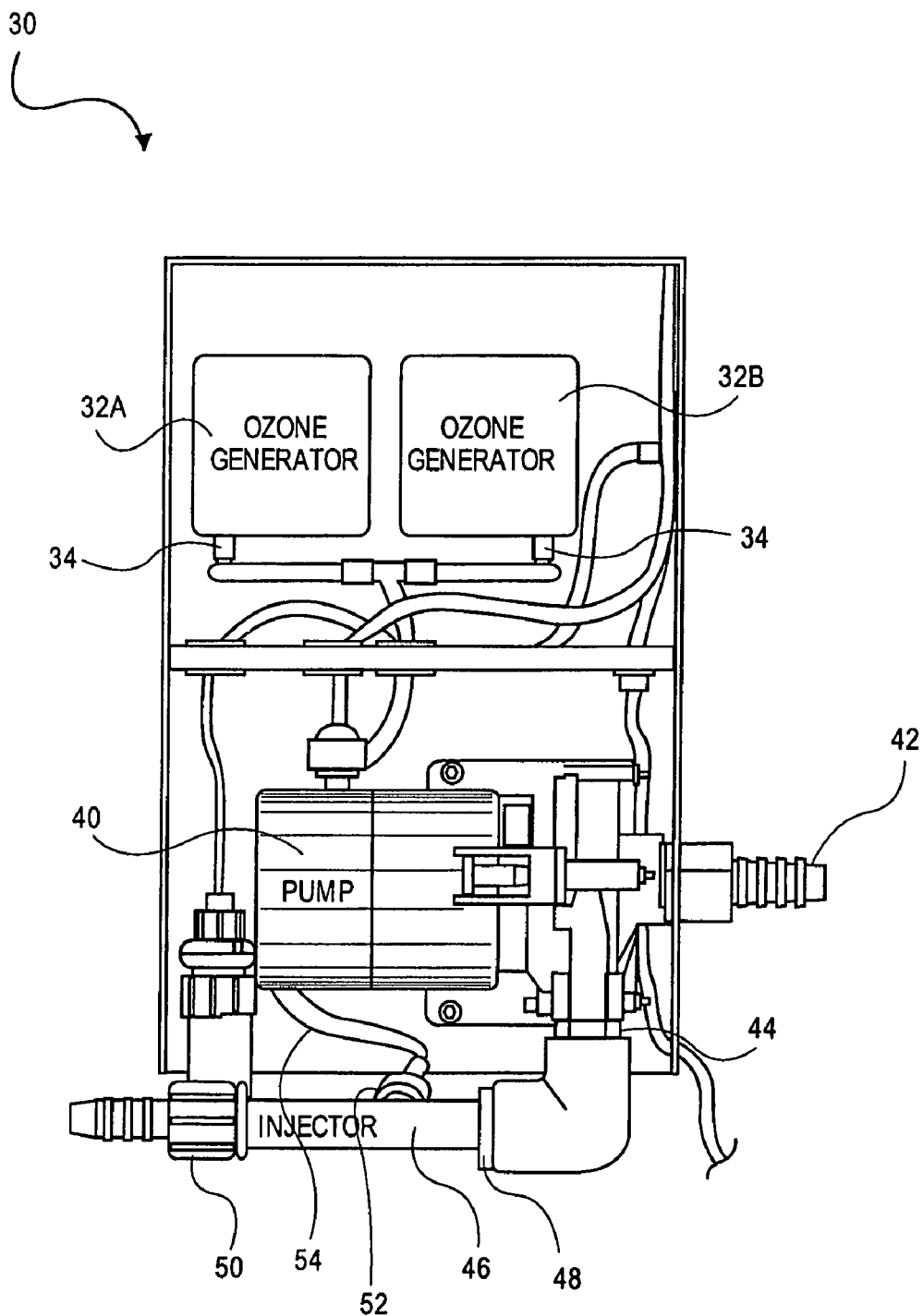
FIG. 2 is a schematic view of a water treatment module for use in an aircraft potable water disinfection and sanitation system according to one embodiment of the invention.

FIG. 2 is a schematic view of the water treatment module 30 shown in FIG. 1. The water treatment module 30 includes ozone generators 32a and 32b. Although, two ozone generators are illustrated, it is to be understood that a greater or lesser number of generators may be used. The ozone generators 32a and 32b generate a supply of ozone used to disinfect the supply of potable water 14 and sanitize the water tank 12, the water transport lines 16, and the water supply lines 28. The ozone generators 32a, 32b each include an outlet 34 defining a path through which the supply of ozone exits the ozone generators 32a, 32b and be incorporated into the water to be treated. The ozone generators 32a, 32b can generate the supply of ozone in various ways. For example, electrical current or other known methods may be used to convert oxygen ($O_2$) to ozone ($O_3$).

FIG. 2 also illustrates a centrifugal pump 40. The centrifugal pump 40 has an inlet 42 through which water to be treated from the water tank 14 enters the centrifugal pump 40. The centrifugal pump 40 adds pressure to the water traveling in through the inlet 42. The centrifugal pump 40 also has an outlet 44 through which the water to be treated exits the centrifugal pump 40. The inlet 42 and the outlet 44 define a first flow path for the water to be treated.

The water treatment module 30 may also include an injector 46. The injector 46 has a first end 48 coupled to the centrifugal pump 40 and a second end 50 adapted to be coupled to a water supply line. The first end 48 and second end 50 of the injector 46 define a second flow path for the water to be treated. The injector 46 also includes an inlet 52 coupled to the ozone generators 32a, 32b with a hollow tubing 54 and defining a third flow path for the supply of ozone to enter the injector 46 and mix with the water to be treated then exit the injector 46.

The water treatment module 30 preferably requires low power consumption, for example, less than 425 watts. However, the water treatment module 30 may be configured to operate on a power level required for a certain aircraft or other application. Additionally, the water treatment module 30 is preferably small in size and weight and self contained. Although any dimensions and weight may be used. The water treatment module 30 may be portable and may not occupy a large amount of space on the aircraft or reduce the amount of cargo that can be transported on the aircraft. The water treatment module 30 may take various shapes and sizes depending on the aircraft, application, load, or other factors, and its energy consumption may also vary.

Figure 3:
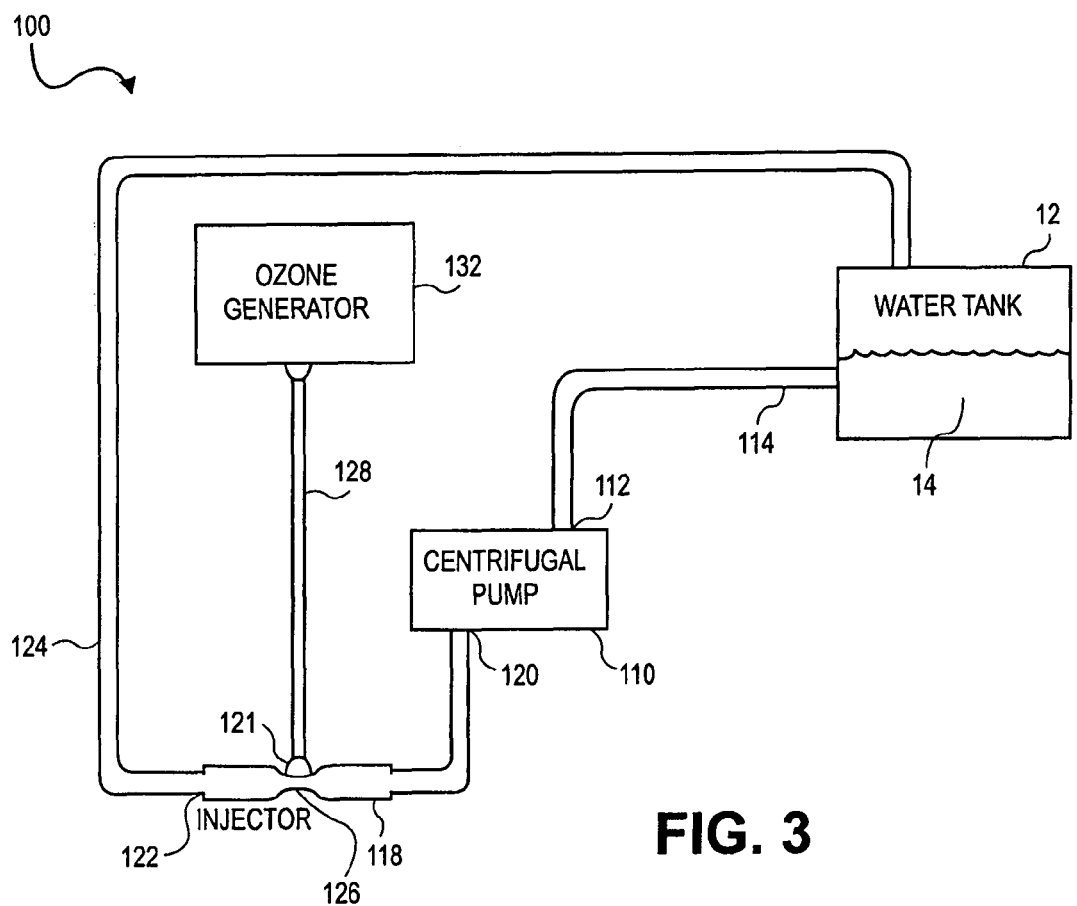
FIG. 3 is a schematic view of a water treatment module and a water supply line for use with an aircraft potable water disinfection and sanitation system according to one embodiment of the invention.

FIG. 3 is a schematic view of a water treatment module 100 according to one embodiment of the invention. The water treatment module 100 includes an ozone generator 32 as described above. A centrifugal pump 110 shunts water from the water tank 12 and has an inlet 112 that is connected to a water supply line 114. The water supply line 114 carries water to be treated from the water tank 12 to the centrifugal pump 110. A first end 118 of an injector 116, for example, an injection venturi, connects to an outlet 120 on the centrifugal pump 110. The injector 116 also includes an inlet 121 connected to the ozone generator 32 via a hollow tubing 128 through which the supply of ozone may enter the injector 116 and disinfect the water. A second end 122 of the injector 116 connects to a second water supply line 124 to return disinfected water to the water tank 12.

The injector 116 may include a tapered constriction 126. The tapered constriction 126 operates to alter the velocity of the water therein. A pressure drop accompanies a change in velocity of the water as it passes through the tapered constriction 126. The pressure drop through the injector 116 creates a negative pressure or a vacuum as measured relative to atmospheric pressure. If the pressure drop is sufficient to create a vacuum, the supply of ozone will flow into the injector 116 and mix with the water to disinfect it.

In order to create a sufficient pressure drop to create a vacuum and cause the supply of ozone to enter the injector 116, the centrifugal pump 110 may be used. The centrifugal pump 110 provides additional pressure to the water entering the injector 116. To generate this additional pressure, water enters the centrifugal pump 110 and kinetic energy generated by the centrifugal pump 110 is converted to pressure. The water then leaves the centrifugal pump 110 with sufficient pressure to generate a vacuum in the injector 116.

The amount of ozone generated in order to treat the water can be calibrated to a level to disinfect only the potable water supply. The amount of ozone generated can also be calibrated to a level high enough to sanitize the entirety of the water system 100 including the water tank 112 and the water transport 14 and supply lines 124. If a sanitation cycle is used, all of the water in the system 100 can be purged from the forward potable water drain port 62 and the aft potable water drain port 70, illustrated in FIG. 1. After the water system 100 has been sanitized by water treated with high levels of ozone, biofilm is inhibited from forming on the water tank 112, the water supply lines 114 and the water transport lines 124.

Figure 4:
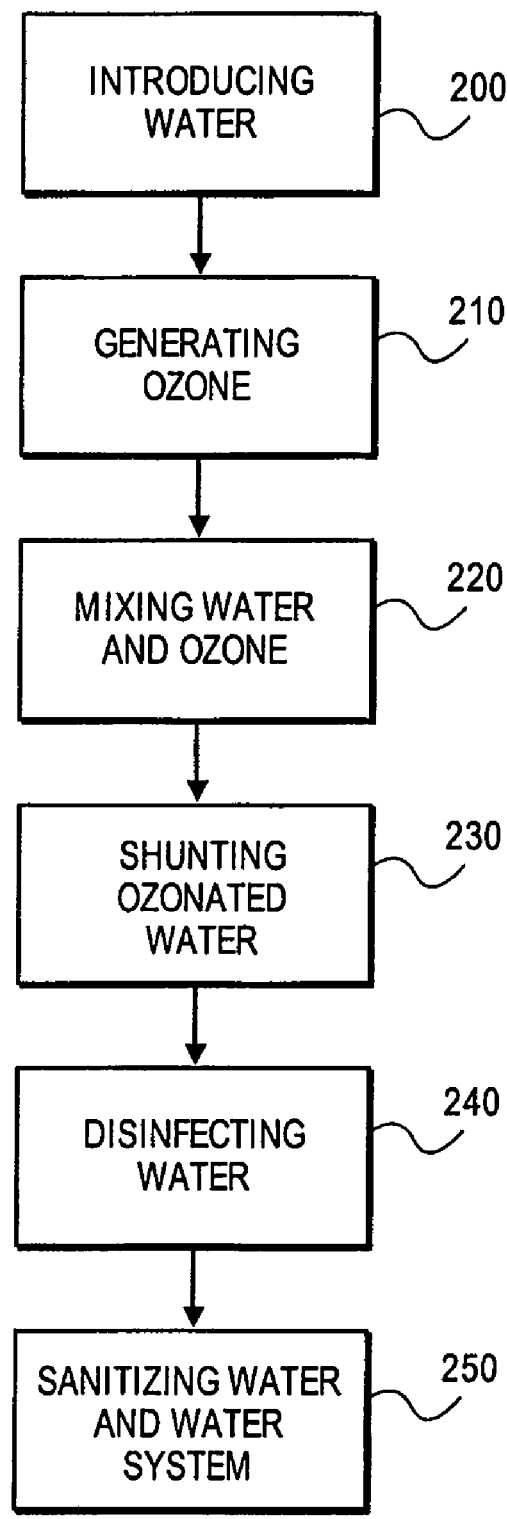
FIG. 4 is a flow chart illustrating a method of disinfecting and sanitizing an aircraft potable water system.

FIG. 4 illustrates a method of disinfecting and sanitizing potable water in an aircraft. The method includes a step 200 of introducing water into a water system on an aircraft. The water may be introduced into a water tank on the aircraft. Another step 210, includes generating a supply of ozone (O3) in at least one ozone generator. The ozone (O3) may be generated in the ozone generator by using electrical current to convert oxygen (O2) to ozone (O3). Step 220 includes mixing the water and the ozone using an injector. Ozonated water is shunted back into a water supply line which may return the water to the water tank in a step 230. In a step 240, the ozonated water mixes with the water in the water tank to disinfect the water in the tank. Another step 250 includes sanitizing the water and the entirety of the water system by increasing the amount of ozone generated to a level that can sanitize the system. The high levels of ozone are mixed with the water and the ozonated water is distributed throughout the entirety of the water system. The water tank, water supply lines, and water transport lines can be sanitized and bio-film can be inhibited by increasing the level of ozone generated.

The many features and advantages of the invention are apparent from the detained specification, and this, it is intended by the appended claims to cover all such features and advantages of the invention which fall within the true spirit and scope of the invention. Further, because numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An aircraft potable water system, comprising:
   a water tank;
   at least one water transport line connecting the water tank to at least one sink or toilet;
   a water fill line connecting a water fill fitting to the water tank;
   a water drain port, coupled to the water transport line, to drain wastewater outside an aircraft;
   a water tank drain valve disposed between the water drain port and the water transport line; and
   a water treatment module, connected to the water transport line and the water fill line, including:
   at least one ozone generator having an outlet,
   a pump having an inlet coupled to the water transport line and an outlet, and an injector having a first end coupled directly to the pump outlet, a second end coupled to the water fill line and an inlet coupled to the ozone generator outlet, wherein the water tank, water transport line, water fill line, water fill fitting, waste drain port, water tank drain valve and water treatment module are installed onboard the aircraft.

2. The aircraft potable water system of claim 1, wherein the ozone generator comprises electrical current to convert oxygen to ozone.

3. The aircraft potable water system of claim 1, wherein the injector comprises an injection venturi.

4. The aircraft potable water system of claim 1, wherein the water treatment module comprises a plurality ozone generators.

5. The aircraft potable water system of claim 1, wherein the water treatment module is adapted to disinfect the untreated water.

6. The aircraft potable water system of claim 1, wherein the water treatment module is adapted to sanitize the water tank, the water fill line, and the water transport lines.

7. The aircraft potable water system of claim 1, wherein the pump comprises a centrifugal pump.

\* \* \* \* \*